(12) United States Patent
Irie (10) Patent No.: US 8,947,576 B2
(45) Date of Patent: Feb. 3, 2015

(54) OPTICAL VIEWFINDER HAVING SELF-LUMINOUS AND NON-SELF-LUMINOUS DISPLAY PORTIONS AND OPTICAL APPARATUS USING SAME

(71) Applicant: Canon Kabushiki Kaisha, Tokyo (JP)

(72) Inventor: Yoshiaki Irie, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/772,983

(22) Filed: Feb. 21, 2013

(65) Prior Publication Data

US 2013/0222669 A1 Aug. 29, 2013

(30) Foreign Application Priority Data

Feb. 24, 2012 (JP) ................. 2012-039022

(51) Int. Cl.

| H04N 5/222 | (2006.01) |
| H04N 5/225 | (2006.01) |
| G02B 13/16 | (2006.01) |
| G03B 13/20 | (2006.01) |
| G03B 13/02 | (2006.01) |
| G03B 13/16 | (2006.01) |

(52) U.S. Cl.
USPC ............... 348/333.09; 348/333.08; 348/341; 348/335; 396/141; 396/148

(58) Field of Classification Search
USPC ............ 348/333.01–333.13, 240.1–240.99; 396/84, 138, 152, 232, 271, 296, 396/373–386

See application file for complete search history.

(56) References Cited

U.S. PATENT DOCUMENTS

| 5,019,854 | A | * | 5/1991 | Mukai et al. .................. 396/121 |
| 5,196,877 | A | * | 3/1993 | Mukai et al. .................... 396/77 |
| 5,363,163 | A | * | 11/1994 | Hayashi et al. ............... 396/379 |
| 5,410,381 | A | * | 4/1995 | Kameyama et al. .......... 396/378 |
| 5,557,328 | A | * | 9/1996 | Ishihama et al. ............ 348/240.3 |
| 5,557,358 | A | * | 9/1996 | Mukai et al. .................. 396/296 |
| 5,706,049 | A | * | 1/1998 | Moghadam et al. ...... 348/333.03 |
| 5,771,416 | A | * | 6/1998 | Mukai et al. .................. 396/378 |
| 6,002,887 | A | * | 12/1999 | Chiba et al. ................... 396/232 |
| 6,097,893 | A | * | 8/2000 | Nakano .......................... 396/51 |
| 6,097,900 | A | * | 8/2000 | Haraguchi .................... 396/287 |
| 6,230,167 | B1 | * | 5/2001 | Lipscomb et al. ............ 715/207 |
| 6,549,237 | B1 | * | 4/2003 | Inuma et al. ............. 348/333.06 |
| 6,556,179 | B2 | * | 4/2003 | Iwane et al. .................... 345/87 |
| 6,738,577 | B1 | * | 5/2004 | Maeda et al. ................. 396/287 |
| 6,850,700 | B2 | * | 2/2005 | Kazami .......................... 396/60 |
| 6,943,839 | B1 | * | 9/2005 | Matsumoto et al. ...... 348/333.01 |
| 6,999,114 | B1 | * | 2/2006 | Chapnik et al. ............ 348/207.2 |
| 7,250,968 | B2 | * | 7/2007 | Ito ............................... 348/240.2 |
| 7,446,941 | B2 | * | 11/2008 | Fukuda ......................... 359/619 |
| 8,659,619 | B2 | * | 2/2014 | Cannon et al. ............... 345/619 |
| 2002/0018136 | A1 | * | 2/2002 | Kaji et al. ................ 348/333.02 |
| 2004/0091257 | A1 | * | 5/2004 | Brost ............................ 396/380 |

(Continued)

FOREIGN PATENT DOCUMENTS

| JP | 8313973 A | 11/1996 |
| JP | 2000180937 A | 6/2000 |

*Primary Examiner* — Chia-Wei A Chen
(74) *Attorney, Agent, or Firm* — Canon USA Inc. IP Division (57) ABSTRACT

An optical viewfinder to observe an object image focused as a primary image by an objective lens includes a first display unit of self-luminous type and a second display unit of non-self-luminous type. The first display unit is arranged at a position closer to a primary image plane of the objective lens than the second display unit in a direction of an optical axis.

6 Claims, 5 Drawing Sheets

(56) References Cited

U.S. PATENT DOCUMENTS

| | | | |
|---|---|---|---|
| 2004/0246282 A1* | 12/2004 | Usui | 347/6 |
| 2005/0036780 A1* | 2/2005 | Iwane | 396/111 |
| 2008/0165316 A1* | 7/2008 | Hasegawa et al. | 349/149 |
| 2008/0239499 A1* | 10/2008 | Fukuda | 359/619 |
| 2009/0190913 A1* | 7/2009 | Kim et al. | 396/296 |
| 2010/0103305 A1* | 4/2010 | Suda et al. | 348/333.02 |
| 2011/0064400 A1* | 3/2011 | Tsujimura et al. | 396/296 |
| 2011/0149139 A1* | 6/2011 | Chang | 348/333.08 |
| 2011/0228140 A1* | 9/2011 | Kazami | 348/240.1 |

* cited by examiner

OPTICAL VIEWFINDER HAVING SELF-LUMINOUS AND NON-SELF-LUMINOUS DISPLAY PORTIONS AND OPTICAL APPARATUS USING SAME

BACKGROUND OF THE INVENTION

1. Field of the Invention

The present application is related to an optical viewfinder, and more particularly to an optical viewfinder including a display element disposed in a viewing optical path of the optical viewfinder and to an optical apparatus, e.g., an image pickup apparatus or an observation apparatus, using the optical viewfinder.

2. Description of the Related Art

In order to increase an amount of information to be displayed on an optical viewfinder of a camera, it has recently been generalized to arrange, near a focusing plate positioned in a primary image plane of an imaging lens, a display panel made of a polymer network liquid crystal display (PNLCD) that has a high transparency and that does not darken a field image in the optical viewfinder.

On that occasion, an information display portion using a liquid crystal is basically set to block off field light and to appear black.

Such a non-self-luminous display portion using the liquid crystal can be made luminous with illumination using LED light, as disclosed in Japanese Patent Laid-Open No. 8-313973. However, the luminance of the display portion is low because of utilizing reflected diffusion light through a liquid crystal polymer. Accordingly, the information on the display portion can visually be confirmed in a satisfactory manner only when the image-taking environment is dark.

Thus, the liquid crystal display method has the drawback that luminescence from the liquid crystal display portion cannot visually be confirmed in a relatively bright place. For example, when an object (person) wearing a black costume overlaps with the liquid crystal display portion appearing black, the information given by the liquid crystal display is very hard to visually recognize.

Japanese Patent Application Laid-Open No. 2000-180937 proposes a technique of disposing an organic electroluminescent element of self-luminous type and a liquid crystal element of non-self-luminous type together in an optical path of an optical viewfinder, the liquid crystal element being disposed on the side nearer to the object. When taking a very bright scene, or a scene including the background in the same color as that of luminescent light, the liquid crystal element is driven to block off light in the background such that representation of an image-taking enable region by the organic electroluminescent element (actually, luminous representation of an image-taking unable region) is more easily visually recognizable.

In the technique disclosed in Japanese Patent Laid-Open No. 2000-180937, however, because the image-taking unable region in a peripheral zone of a viewfinder field is displayed with luminescence of the organic electroluminescent element, a wide area including the image-taking unable region needs to be made luminous in a non-glaring, faint and uniform way. Moreover, uncomfortable sensing is basically inevitable in such a point that the image-taking unable region is displayed with higher legibility, i.e., that the image-taking unable region is displayed with luminescence to be more noticeable.

As another region display method using a self-luminous display element, e.g., an organic electroluminescent element, it is known to make luminous only a line indicating the boundary of a region to be displayed. However, such a method cannot be said as being superior in terms of a function of displaying the image-taking enable region because an object image appears similarly in both the image-taking unable region and the image-taking enable region.

For the reason described above, it is understood that, when displaying a large area, such as when displaying the image-taking enable region, better legibility is obtained by driving the liquid crystal display element to block off the light such that a photographer can view only the actual image-taking enable region.

Japanese Patent Laid-Open No. 2000-180937 discloses that the liquid crystal display element is disposed nearer to the object than the organic electroluminescent element, but it does not discuss the problem regarding what positional relationship is to be satisfied by each display element with respect to a primary image plane of an imaging lens, in particular the difference in appearance between representation of a focus detection region for auto-focusing and an object image, i.e., an optimum panel arrangement in consideration of the diopter difference among observers.

As seen from the above discussion, a novel display method is demanded which can optimally perform various kinds of information display, including the case of displaying the image-taking enable region of a camera in viewfinder display.

SUMMARY OF THE INVENTION

An embodiment of the present invention provides an optical viewfinder capable of, when a self-luminous display element and a non-self-luminous display element for blocking off finder light are disposed together in the optical viewfinder, allowing a photographer to simultaneously observe an optical object image and various types of representations indicating the status of an optical apparatus in a easily legible manner with the optical viewfinder.

According to an embodiment of the present invention, there is provided an optical viewfinder configured to observe an object image focused as a primary image by an objective lens, the optical viewfinder including a first display unit of self-luminous type and a second display unit of non-self-luminous type, wherein the first display unit is arranged at a position closer to a primary image plane of the objective lens than the second display unit in a direction of an optical axis.

According to another embodiment of the present invention, in the above optical viewfinder, the first display unit includes a boundary line display portion configured to display outer peripheries of field regions of the optical viewfinder, which correspond to a plurality of finder field ranges optionally selectable by an observer, and a display region of the second display unit is arranged outside the boundary line display portion.

According to still another embodiment of the present invention, in the above optical viewfinder, the second display unit is arranged in peripheral zones of a finder field and blocks off object light to make the field region of the optical viewfinder variable in size.

According to still another embodiment of the present invention, in the above optical viewfinder, the first display unit of self-luminous type is disposed between a first transparent substrate and a second transparent substrate, the second display unit of non-self-luminous type is disposed between the second transparent substrate and a third transparent substrate, and the first transparent substrate has a smaller thickness than the second transparent substrate.

According to still another embodiment of the present invention, in the above optical viewfinder, the second transparent substrate includes a projecting portion that extends outward of edges of the first transparent substrate and the third transparent substrate, a wiring pattern configured to drive the first display unit is formed on a first surface of the projecting portion on a same side as the first display unit, and a wiring pattern configured to drive the second display unit is formed on a second surface opposite to the first surface of the projecting portion on a same side as the second display unit.

According to still another embodiment of the present invention, in the above optical viewfinder, the first display unit includes an electroluminescence element, and the second display unit includes a polymer network liquid crystal.

According to still another embodiment of the present invention, there is provided an image pickup apparatus including an imaging lens configured to form a primary image of an object scene at a primary image plane, and an optical viewfinder disposed at a predetermined distance of the primary image plane and configured to observe the primary image focused by the imaging lens, wherein the optical viewfinder includes a first display unit of self-luminous type and a second display unit of non-self-luminous type, and wherein the first display unit is arranged at a position closer to the primary image plane of the imaging lens than the second display unit in a direction of an optical axis thereof.

With the embodiments of the present invention, when the self-luminous display element and the non-self-luminous display element for blocking off the finder light are disposed together in the optical viewfinder, a photographer can simultaneously observe the optical object image and various types of representations indicating the status of the optical apparatus in an easily legible manner with the optical viewfinder.

Further features of the present invention will become apparent from the following description of exemplary embodiments with reference to the attached drawings.

DESCRIPTION OF THE EMBODIMENTS

An embodiment of the present invention will be described in detail below with reference to the attached drawings.

Embodiment

The embodiment of the present invention will be described in detail below with reference to FIGS. 1A to 6. It is to be noted that the same component is denoted by the same reference symbol in FIGS. 1A to 6.

Figure 2:
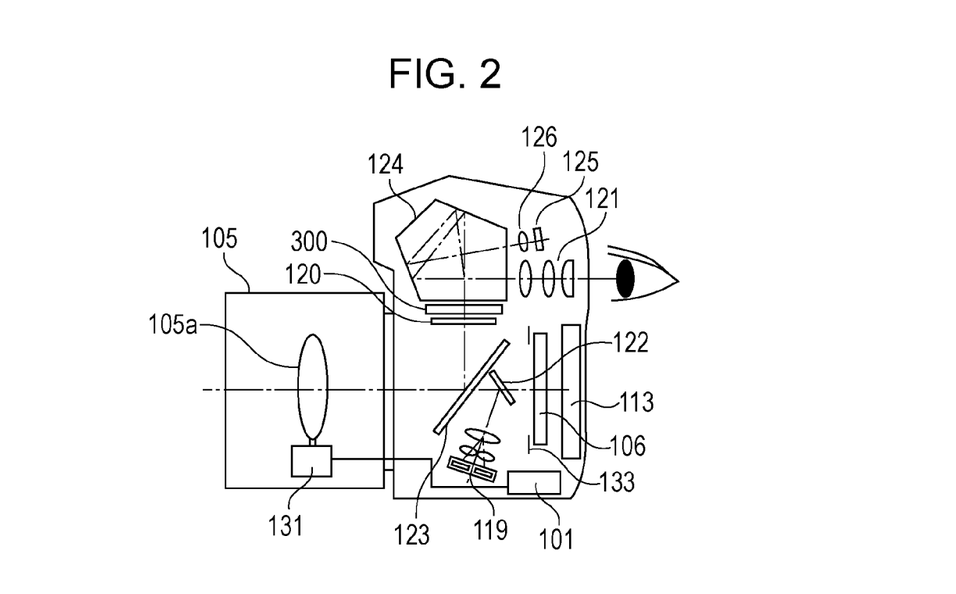
FIG. 2 is a schematic view illustrating a structure of a camera, as an example of an image pickup apparatus.

FIG. 2 is a schematic view illustrating a structure of a digital single-lens reflex camera, i.e., an example of an image pickup apparatus, to which the present invention is applied.

In FIG. 2, reference symbol 101 denotes a CPU (Central Processing Unit). Operation of the camera is controlled by the CPU 101. An imaging lens 105 serves as an objective lens and focuses light from an object scene on a CCD or CMOS sensor 106 which is an example of an image pickup element (image pickup unit). The imaging lens 105 includes a lens unit 105a and a lens driving unit 131 (e.g., ultrasonic motor USM). While the imaging lens 105 in FIG. 2 is illustrated as including a single piece lens in the lens unit 105a for the sake of simplicity, the lens unit 105a may actually include plural lenses.

Reference symbol 120 denotes a focus detection plate (hereinafter referred to as a "focusing plate") placed in an image plane (primary image plane) that is equivalent to an image plane focused by the imaging lens 105 on the CCD sensor 106. An object image is reflected by a main mirror 123 (first mirror) and is focused as a primary image on the focusing plate 120.

According to an embodiment, an optical viewfinder is of the so-called TTL (Through The Lens) type in which a photographer is able to view the object image through a pentaprism 124 and an eyepiece lens unit 121.

The main mirror 123 is a semi-transmissive mirror (half mirror). A part of a light beam passes through the main mirror 123, and it is introduced to a focus detection unit 119, which embodies a focus detection unit defined in Claims, through a sub-mirror 122 (second mirror) in order to perform the focus detection operation of the known phase difference detection type. The focus detection unit 119 is able to detect a focus for each of plural regions of an image frame.

Reference numeral 125 denotes a photometric sensor made up of plural photo detectors, which is able to detect the luminance for each of plural regions of the object image focused by a photometric lens 126 on the focusing plate 120.

When the photographer presses a release switch 114 (shown in FIG. 4), the main mirror 123 is retracted (removed) from the optical path of the imaging lens 105. While the main mirror 123 is removed from the optical path, a quantity of the object light condensed by the imaging lens 105 is controlled by a focal plane shutter 133 and is subjected to a photoelectric conversion process by the CCD sensor (image pickup element) 106 to be displayed as an object image. Thereafter, the object image is recorded as a picked-up image in a recording medium, while the picked-up image is displayed on an outer display unit 113 that is a color liquid crystal display of TFT (Thin Film Transistor)-type.

The above-described operation is a usual still image shooting. The camera of the embodiment is further able to perform live view shooting and movie shooting.

Reference symbol 300 denotes a display panel for displaying a camera status in the optical viewfinder that is arranged to observe the object's primary image focused by the objective lens.

The display panel 300 will be described below with reference to FIGS. 1, 3 and 5.

Figure 1A:
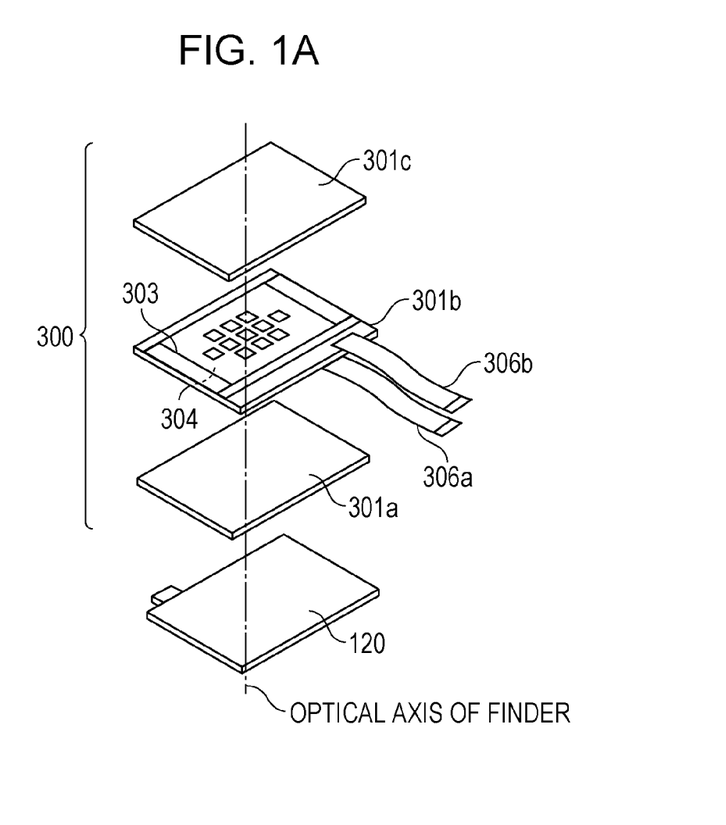
FIG. 1A is an exploded perspective view and FIG. 1B is a cross-sectional view illustrating explanatory views of an optical viewfinder display panel.
Figure 1B:
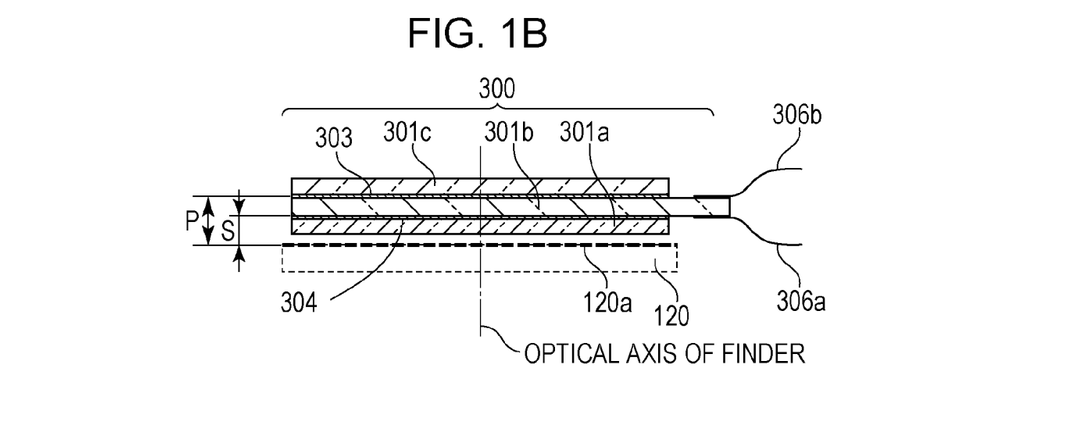

FIG. 1A is an exploded perspective view illustrating the structure of the display panel 300, and FIG. 1B is a sectional view of the display panel 300.

Reference symbols 301a, 301b and 301c denote substrates, which are each made of transparent glass and which are referred to as a "first transparent substrate", a "second transparent substrate", and a "third transparent substrate", respectively. The second transparent substrate 301b includes an electroluminescence element (organic EL element) mounted on a surface (rear surface) thereof. The first transparent substrate 301a is disposed to face the second transparent substrate 301b in a sealing manner, thus protecting a mounted portion of the electroluminescence element (organic EL element).

The focusing plate 120, the first transparent substrate 301a, the second transparent substrate 301b, and the third transparent substrate 301c are successively arranged in the mentioned order from the side nearer to the object in the direction in which light travels from the object scene to the display panel 300 along an optical axis of the viewfinder.

On the front surface side (light output side) of the second transparent substrate 301b, the material of a polymer network liquid crystal display (PNLCD) (also called the "polymer network liquid crystal" hereinafter) is filled between the second transparent substrate 301b and the third transparent substrate 301c positioned to face the former.

Figure 3:
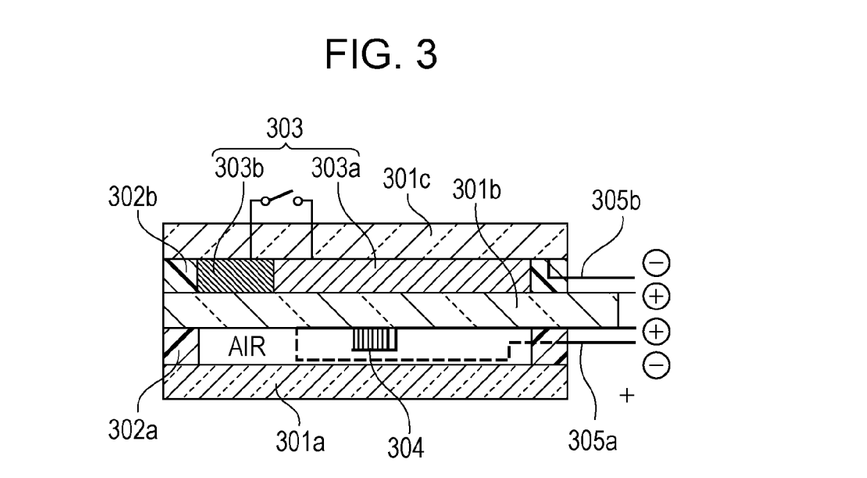
FIG. 3 is an enlarged explanatory sectional view of the optical viewfinder display panel.

FIG. 3 is an enlarged explanatory sectional view of the display panel 300 illustrated in FIG. 1B, and FIGS. 5A, 5B and 5C are explanatory views of representations that can be visually confirmed by the observer in the optical viewfinder in accordance with the operation of the display panel 300. The structure of the display panel 300 is described in more detail with reference to FIGS. 1B, 3 and 5A to 5C of the drawings.

In FIG. 3, transparent wiring patterns 305a as transparent electrodes made of ITO (Indium Tin Oxide) are formed on the rear surface of the second transparent substrate 301b, and organic electroluminescent materials are layered between anode portions and cathode portions of the wring pattern 305a. When current is supplied to an organic electroluminescent portion 304 (first display unit), the organic electroluminescent portion 304 emits light that can be visually recognized in the optical viewfinder of the camera. Furthermore, the cathode portion may be made of a non-transparent metal film, e.g., aluminum film, instead of ITO for the purpose of preventing injection of electrons into the organic electroluminescent portion 304. In such a case, when the organic electroluminescent portion 304 is in a non-luminous state, the non-transparent metal film provides a display portion that blocks off the object light and that appears black in the optical viewfinder.

Reference symbol 302a denotes a sealing adhesive made of synthetic resin. The sealing adhesive 302a seals off a space between the first transparent substrate 301a and the second transparent substrate 301b. In practice, the spacing between the substrates is set to several tens of microns, and an absorbent for absorbing moisture is disposed in the sealed-off space outside a finder field.

Transparent wiring patterns 305b made of ITO are formed on a front surface of the second transparent substrate 301b and on a surface of the third transparent substrate 301c, which is positioned to face the former front surface.

The material of the polymer network liquid crystal display (PNLCD) is filled between the second and third transparent substrates 301b and 310c. When no voltage is applied, the display panel is entirely in a non-transparent state. However, when a voltage is applied between the electrode on the second transparent substrate 301b and the electrode on the third transparent substrate 301c, the polymer network liquid crystal is changed to a transparent state only in an electrode region under the action of electric charges.

In FIG. 3, for example, a portion denoted by 303a becomes always transparent when a current is supplied to both the upper and lower electrodes. On the other hand, a portion denoted by 303b is a display portion capable of being selectively switched to the transparent state or the non-transparent state because the current supply to the electrode on the one side can be cut off. Reference symbol 302b denotes a sealant for sealing off the liquid crystal. The spacing between the electrode on the second transparent substrate 301b and the third transparent substrate 301c is maintained at about 10 μm with the aid of a gap spacer (not illustrated). A polymer network liquid crystal portion 303 (second display unit) including both the portions 303a and 303b is thus constructed.

The display panel 300 has the basic structure described above. In practice, however, representation patterns on the display panel 300 are constituted by many wiring patterns 305a and 305b.

Figure 5A:
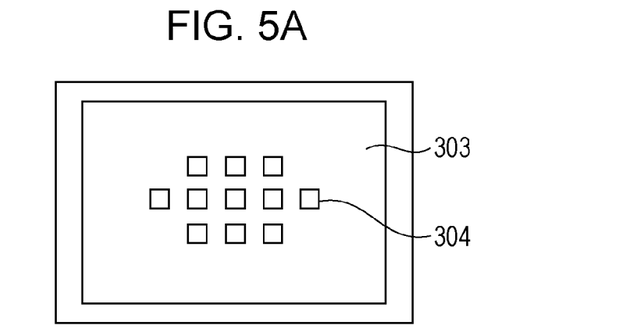
FIGS. 5A, 5B and 5C are explanatory views (No. 1) of representations displayed in an optical viewfinder.
Figure 5B:
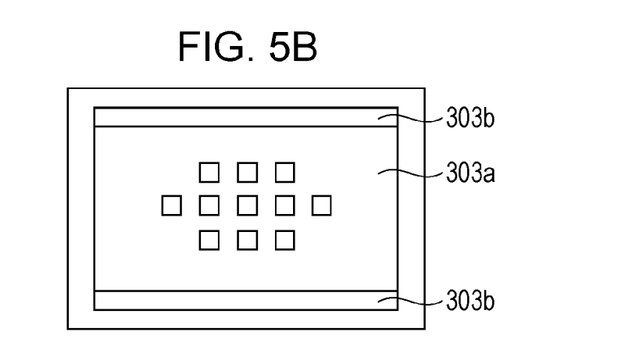
Figure 5C:
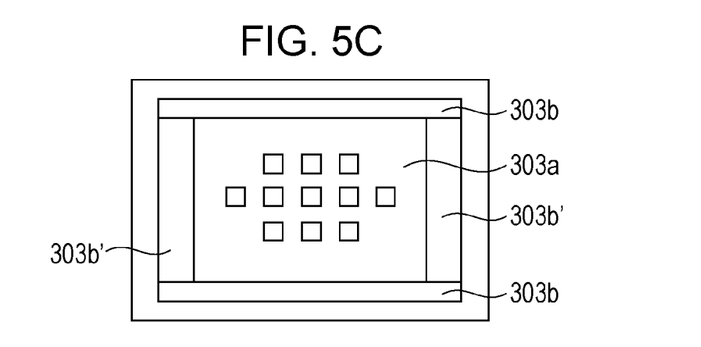

FIGS. 5A, 5B and 5C illustrate representations displayed in the finder field, which can be actually observed by the observer in the optical viewfinder of the camera (image pickup apparatus). In FIG. 5A, eleven squares positioned near a center represent focus detection regions in each of which the focus can be detected by the focus detection unit 119. In practice, the square shapes are formed by the organic electroluminescent portions 304 corresponding to the focus detection regions such that each focus detection region is lighted on or off depending on a focusing position of the object.

Furthermore, in FIG. 5A, because a voltage is applied to upper and lower light-blocking regions 303b and right and left light-blocking regions 303b' as described later, those light-blocking regions 303b and 303b' are not in a light-blocking state, whereby the polymer network liquid crystal portion 303 is entirely in a transparent state. Thus, the entire finder field is coincident with a still image taking range (normal shooting mode with an aspect ratio of 2:3).

In FIG. 5B, upper and lower partial regions of the finder field are set as the upper and lower light-blocking regions 303b which can be selectively switched into the transparent state or the non-transparent state depending on whether a current is supplied to the polymer network liquid crystal portion 303 or not. With no supply of the current to the upper and lower light-blocking regions 303b, those light-blocking regions 303b are held in the non-transparent state. As a result, the optical viewfinder can provide a representation indicating that the image taking range of the camera in the movie shooting mode is a high-definition size (movie shooting mode with an aspect ratio of 9:16).

In addition to the upper and lower light-blocking regions 303b in FIG. 5B, right and left partial regions of the finder field are set as the right and left light-blocking regions 303b' which can be selectively switched into the transparent state or the non-transparent state depending on whether a current is supplied to the polymer network liquid crystal portion 303 or not. In FIG. 5C, by not supplying the current to the upper and lower light-blocking regions 303b and the right and left light-blocking regions 303b' at the same time, i.e., by switching those light-blocking regions 303b and 303b' into the non-transparent state at the same time, the optical viewfinder provides a finder display range corresponding to pseudo telephoto shooting (crop shooting mode with an aspect ratio of 2:3) in which the image taking range is restricted to a narrower central region than the intrinsic image taking range.

The above-described various shooting modes can be optionally set by a shooting-mode setting switch (not illustrated). The polymer network liquid crystal is selectively controlled into the transparent state or the non-transparent state in accordance with the setting of the shooting-mode setting switch such that the light-blocking regions are automatically changed over as illustrated in FIGS. 5A, 5B, and 5C.

Returning to FIG. 3 again, the wiring patterns for driving the polymer network liquid crystal portion 303 and the organic electroluminescent portion 304 will be described below. As described above, the polymer network liquid crystal is filled in the space sandwiched between the second transparent substrate 301b and the third transparent substrate 301c.

On the front surface of the second transparent substrate 301b positioned to face the third transparent substrate 301c, there are not only transparent electrodes made of ITO and disposed over zones corresponding to the upper and lower light-blocking regions 303b and the right and left light-blocking regions 303b', but also two wiring lines connected to those light-blocking regions 303b and 303b'. On the rear surface (lower surface) of the third transparent substrate 301c which faces the front surface of the second transparent substrate 301b, there are a transparent electrode made of ITO and disposed over the entire surface, and an only one common wiring line connected to the transparent electrode.

Stated in another way, the organic electroluminescent portion 304 serving as the first display unit of self-luminous type is disposed between the first transparent substrate 301a and the second transparent substrate 301b, and the polymer network liquid crystal portion 303 serving as the second display unit of non-self-luminous type is disposed between the second transparent substrate 301b and the third transparent substrate 301c. The first transparent substrate 301a has a smaller thickness than the second transparent substrate 301b.

With the above-described arrangement of the wiring patterns, the various regions of the polymer network liquid crystal portion 303 can individually be controlled into the transparent state or the non-transparent state. While the wiring patterns for driving the polymer network liquid crystal portion 303 are separately disposed on the respective surfaces of the two transparent substrates positioned to face each other as described above, input terminals can all be collected on only the front (upper) surface of the second transparent substrate 301b by employing the sealant 302b made of conductive resin.

On the other hand, wiring patterns for transparent electrodes made of ITO and driving the organic electroluminescent portion 304 can be provided by forming square ITO patterns corresponding to a predetermined number of focus detection regions (e.g., eleven) to be displayed, eleven lines connected to the square ITO patterns, and a one common line on only the rear (lower) surface of the second transparent substrate 301b. As seen from FIG. 3, the second transparent substrate 301b has a shape projecting in one direction as compared with the other transparent substrates.

More specifically, the second transparent substrate 301b has a portion projecting outward of edges of the first transparent substrate 301a and the third transparent substrate 301c. The wiring patterns for driving the first display unit are formed on one surface of the projecting portion on the same side as the first display unit, and the wiring patterns for driving the second display unit are formed on the opposite surface of the projecting portion on the same side as the second display unit.

Stated in another way, a portion (projecting portion) of the second transparent substrate 301b projects or extends outward of edges of the first transparent substrate 301a and the third transparent substrate 301c and serves as a wiring surface where wiring patterns are formed. The wiring patterns for driving the organic electroluminescent portion 304 as the first display unit are formed on one surface of the projecting portion on the same side as the first display unit, and the wiring patterns for driving the polymer network liquid crystal portion 303 as the second display unit are formed on the opposite surface of the projecting portion on the same side as the second display unit.

Since, as described above, the wiring patterns 305b for driving the polymer network liquid crystal portion 303 as the second display unit are all collected on the flat front (upper) surface of the projecting portion, the wiring patterns 305b can be easily connected to a flexible printed board 306b from the front surface (first surface) of the projecting portion. Furthermore, since the wiring patterns 305a for driving the organic electroluminescent portion 304 are all originally collected on the rear (lower) surface of the second transparent substrate 301b, the wiring patterns 305a can similarly be easily connected to a flexible printed board 306a from the rear surface (opposite surface) of the projecting portion.

Thus, the polymer network liquid crystal portion 303 and the organic electroluminescent portion 304 can be driven to display representations thereon just by supplying drive signals to them through the two flexible printed boards 306a and 306b that are connected to only the second transparent substrate 301b. Therefore, the above-described arrangement facilitates handling of the substrates and contributes to saving space. Moreover, the two flexible printed boards 306a and 306b may be branched from a single flexible printed board.

As described above, the display panel 300 is able to perform not only self-luminous display by the organic electroluminescent portion 304 of self-luminous type for presenting the representation of the camera status in the optical viewfinder, but also light-blocking display by the polymer network liquid crystal portion 303 of non-self-luminous type. Returning now to FIGS. 1A and 1B again, it is seen that the focusing plate 120 is positioned under the display panel 300 (on the side closer to the object scene) along the optical axis of the viewfinder.

During operation, while the field image focused as a primary image by the imaging lens 105 is projected on the focusing plate 120, a plane on which the field image is projected is actually given as a matt surface 120a that is an upper surface of the focusing plate 120. The optical viewfinder of the camera enables, as described above, an image focused on the matt surface 120a to be observed in an enlarged scale through the eyepiece lens unit 121.

With respect to the matt surface 120a, a display plane on which the organic electroluminescent portion 304 is present is spaced by a distance S and a display plane on which the polymer network liquid crystal portion 303 is present is spaced by a distance P along the optical axis of the viewfinder.

Ideally, the object image and the display image are to be arranged at the same eye's focusing position. However, insofar as the focusing plate 120 and the display panel 300 are present in different planes, it is impossible to arrange both the images at the same eye's focusing position. In other words, the object image and the display image are to be arranged as close as possible to each other.

Generally, the Newton's imaging formula holds between the focal position of a lens and the distance to an image from the focal position. When an object is placed at a position closer to the lens with respect to the focal position of the lens, light forms a virtual image instead of a real image. In the optical viewfinder, a state where a virtual image is focused at a distance of 1 min such a manner is defined as a diopter of −1 dpt.

Thus, the diopter of the optical viewfinder can be expressed by the following formula (1)

$$d = -1000/(f^2/x - f) \quad (1)$$

In the formula (1), x (mm) is the distance from the focal position of an eyepiece lens on the object side to the object, i.e., the distance from the focal position on the object side to each display plane in the case of the display panel 300. Furthermore, f (mm) is the focal length of the eyepiece lens.

The position x of the focusing plate 120, which is the primary image plane of the imaging lens 105, is given as 4.6 mm from the formula (1) on condition that a (composite) focal length f of the eyepiece lens unit 121 is 70 mm and a design center diopter d is −1.0 dpt. Thus, the finder diopter of −1.0 dpt can be obtained by arranging the matt surface 120a of the focusing plate 120 at a distance of 4.6 mm spaced from the focal position of the eyepiece lens toward the side closer to the photographer's eye.

On the other hand, the distance (corresponding to S in FIG. 1B) from the matt surface 120a to the surface of the organic electroluminescent portion 304 is 1.2 mm on condition that the thickness of each of the three transparent substrates 301a, 301b and 301c is 0.7 mm, and the spacing between the matt surface 120a of the focusing plate 120 and the surface of the display panel 300 is 0.3 mm.

Similarly, the distance (corresponding to P in FIG. 1B) from the matt surface 120a to the surface of the polymer network liquid crystal portion 303 is 1.9 mm. By substituting the above-mentioned distance to each display plane in the formula (1), the diopter is calculated as −1.24 dpt for the organic electroluminescent portion 304 and −1.41 dpt for the polymer network liquid crystal portion 303. Because the object distance and the diopter (dpt) are in a reversal relation to each other, the above point can be said as follows. When observing the object image (i.e., the image on the focusing plate) at the distance of 1 m, the representation by the organic electroluminescent portion 304 that displays the status representation of the focus detection region appears at a distance of 0.81 m, and the representation by the polymer network liquid crystal portion 303 that displays the light-blocking region indicating the image-taking enable range appears at a distance of 0.71 m. Accordingly, the photographer causes the eye to be focused on each of those display images.

Stated another way, since the display panel 300 is constructed such that the organic electroluminescent portion 304 is positioned closer to the focusing plate 120 than the polymer network liquid crystal portion 303, the representation by the organic electroluminescent portion 304 is displayed with a less focusing deviation of the eye than the representation by the polymer network liquid crystal portion 303 when the eye is focused on the object image on the focusing plate 120. Accordingly, the focusing deviation is less awkward. Another advantage is that the eye is less fatigued because the photographer is not required to intentionally make focusing of the eye.

The status representation of the focus detection region displayed by the organic electroluminescent portion 304 is a representation positioned near the center of the viewfinder. For that status representation, the positional relationship relative to the object image is very important, and the diopter deviation discussed above is to be minimized. On the other hand, the representation of the light-blocking region indicating the image-taking enable range, which is displayed by the polymer network liquid crystal portion 303, is a representation that is positioned in an outer peripheral portion of the finder field and that is less carefully viewed in the shooting. Thus, the representation displayed by the polymer network liquid crystal portion 303 can be regarded as being more tolerable to the diopter deviation.

For the reason described above, the display plane of the organic electroluminescent portion 304 is arranged closer to the focusing plate 120 than the display plane of the polymer network liquid crystal portion 303.

While in the above description the thickness of each of the three transparent substrates 301a, 301b and 301c constituting the display panel 300 is set to 0.7 mm, it is most effective, from the viewpoint of making the diopter for each display portion closer to the diopter for the object, to minimize the thickness of the first transparent substrate 301a, which is a protective member for the organic electroluminescent portion 304, to 0.3 mm, for example. Because the ITO patterns are formed by, e.g., vapor deposition on both the front and rear surfaces of the second transparent substrate 301b, the second transparent substrate 301b is required to have a certain degree of strength and resistance against deformation. Hence there is a difficulty in reducing the thickness of the second transparent substrate 301b.

When the thickness of the first transparent substrate 301a is set to 0.3 mm, results of calculations similar to those described above are as follows. Given that the image on the focusing plate is present at the distance of 1 m, the representation by the organic electroluminescent portion 304 appears at a distance of 0.87 m, and the representation by the polymer network liquid crystal portion 303 appears at a distance of 0.76 m. Thus, status representation in the viewfinder can be realized with more legibility.

Modification

Figure 6:
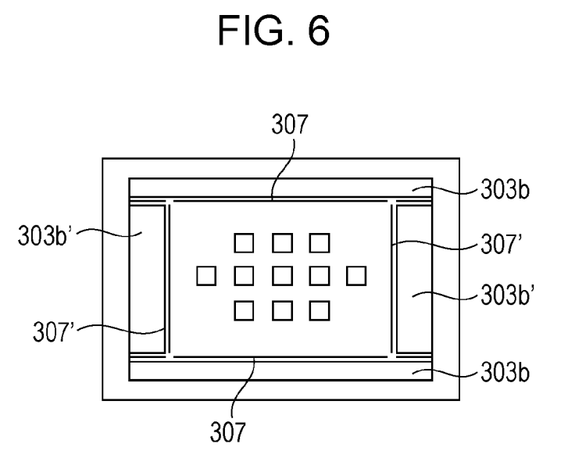
FIG. 6 is an explanatory view (No. 2) of a representation displayed in the optical viewfinder.

FIG. 6 illustrates a modification that is intended to cope with the problem that the representation by the polymer network liquid crystal portion 303 for the light-blocking display is hard to visually recognize under a dark shooting condition. To that end, the organic electroluminescent portions 304 designed to display only the focus detection regions in the above-described embodiment are modified so as to additionally include boundary line display portions for displaying outer peripheries of the field regions of the optical viewfinder, which correspond to a plurality of finder field ranges optionally selectable by the observer.

The polymer network liquid crystal portion 303 as the second display unit is arranged in peripheral zones of the finder field and blocks off the object light to make the field region of the optical viewfinder variable in size.

Stated another way, in a dark shooting scene, the boundary line display portions with the organic electroluminescence are turned to be luminous in order to display boundary lines between the light-blocking regions and the image-taking region, thereby representing the image-taking region, in addition to the light-blocking display by the polymer network liquid crystal portion 303. In this modification, the display panel 300 is also constructed such that the organic electroluminescent portions 304 are arranged nearer to the focusing plate 120 than the polymer network liquid crystal portion 303.

In the positional relationship described above, if the boundary line display portions included in the organic electroluminescent portions 304 and edges of the light-blocking regions of the polymer network liquid crystal portion 303 are arranged at the same position, the boundary line display portions with the organic electroluminescence are positioned apart from or overlapped with the light-blocking regions of the polymer network liquid crystal portion 303 at the edges of the light-blocking regions when the observer swings the eye while viewing through the viewfinder. Thus, the boundary line display portions appear bright or black corresponding to the eye swing.

In view of the above-mentioned point, as illustrated in FIG. 6, boundary line display portions 307 (horizontal lines) with the organic electroluminescence and boundary line display portions 307' (vertical lines) with the organic electroluminescence are arranged at positions exactly indicating the boundaries of the image-taking region, while the light-blocking regions 303b (upper and lower light-blocking regions) and 303b' (right and left light-blocking regions) displayed by the polymer network liquid crystal are arranged in such sizes that they are positioned outside the corresponding boundary line display portions with the organic electroluminescence (when viewed from the center of a finder viewing screen).

The positions of the edges of the light-blocking regions displayed by the polymer network liquid crystal may be set by tracking a light ray from an assumed position of the eye of the observer viewing through the eyepiece lens unit 121 to the position of each boundary line display portion with the organic electroluminescence, and by arranging the corresponding edge of the light-blocking region to be positioned outside the tracked light ray. Since tracking the light ray can be performed with an ordinary calculation process, description of detailed numerical values in the calculation process is omitted here.

With the above-described setting of the display regions, the boundary line display portions with the organic electroluminescence are reliably not hidden by the representation displayed by the polymer network liquid crystal. It is therefore possible to clearly represent, even under dark shooting environment, not only the exact image-taking region with a less diopter deviation by employing the organic electroluminescence, but also the limitation of the image-taking region by blocking off the light of the object image with the polymer network liquid crystal.

Figure 4:
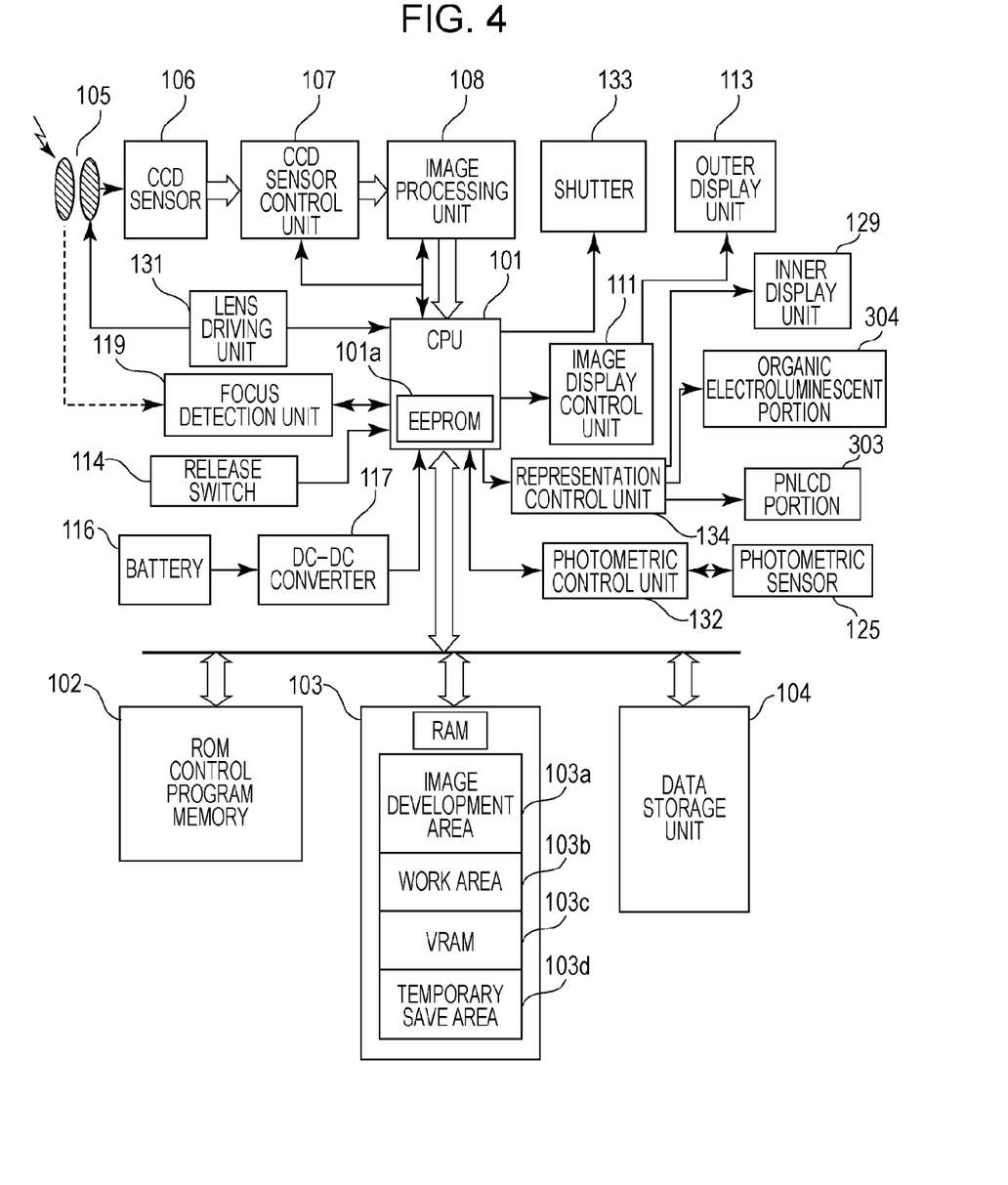
FIG. 4 is a block diagram illustrating functional electronic blocks (circuits) of the image pickup apparatus.

FIG. 4 is an electric block diagram of a digital single-reflex camera according to the embodiment of the present invention. In FIG. 4, reference symbol 101 denotes the above-mentioned CPU (Central Processing Unit), which incorporates an EEPROM 101a as a nonvolatile memory.

Connected to the CPU 101 are a ROM (Read Only Memory) 102 storing control programs, a RAM (Random Access Memory) 103, a data storage unit 104, an image processing unit 108, an image display control unit 111, a release switch 114, and a DC-DC converter 117 for supplying electric power. A CCD sensor control unit 107 and a CCD sensor 106 are connected to the image processing unit 108. The CCD sensor 106 has effective pixels in number of about 10 millions (3888×2592).

An outer display units 113 disposed in each of two locations, i.e., in a rear exterior portion of the camera and within the viewfinder, is a color liquid crystal display of TFT type capable of displaying an image that is obtained by thinning out the image picked up by the CCD sensor 106 in the vertical and horizontal directions.

The image display control unit 111 operates so as to display a still image and a movie image, which are picked by the CCD sensor 106, on the outer display unit 113. Electric power is supplied to the DC-DC converter 117 from the battery 116.

The CPU 101 executes various types of control in accordance with control programs stored in the ROM 102. The various types of control include a process of reading a picked-up image signal output from the image processing unit 108 and transferring it to the RAM 103, a process of transferring data from the RAM 103 to the image display control unit 111, and a process of compressing image data into JPEG data and storing it in the form of a file into the data storage unit 104. Movie data is also compressed into a file in the MOV format and then stored in the data storage unit 104 through processing similar to that described above.

Furthermore, the CPU 101 instructs the number of pixels to be taken as data and change of digital image processing, for example, to the CCD sensor 106, the CCD sensor control unit 107, the image processing unit 108, the image display control unit 111, etc.

Reference symbol 119 denotes a focus detection unit including a pair of line CCD sensors for focus detection. The focus detection unit 119 performs analog to digital (A/D) conversion of a voltage signal obtained from each line CCD sensor and sends the converted voltage to the CPU 101. The focus detection unit 119 further controls an accumulation time and performs AGC (Automatic Gain Control) in each line CCD sensor in accordance with an instruction from the CPU 101.

Other various processes, such as instructing the shooting operation in response to pressing of the release switch 114, and outputting, to the DC-DC converter 117, control signals for controlling supply of power to various elements, are also executed under control of the CPU 101.

The RAM 103 includes an image development area 103a, a work area 103b, a VRAM 103c, and a temporary save area 103d. The image development area 103a is used as a temporary buffer for temporarily storing the picked-up image (YUV digital signal) sent from the image processing unit 108 and JPEG-compressed image data read out from the data storage unit 104, or as an image-dedicated work area for image compression and decompression processes.

The work area 103b is a work area used to execute the various programs. The VRAM 103c is used as a VRAM for storing display data to be displayed on the outer display unit 113. The temporary save area 103d is an area into which various data are temporarily saved.

The data storage unit 104 is a flash memory for storing, in the form of a file, the picked-up image data having been JPEG-compressed by the CPU 101, or movie data in the MOV format. The CCD sensor 106 is able to output pixel data having been thinned in the horizontal and vertical directions in accordance with a resolution conversion instruction from the CPU 101.

The CCD sensor control unit 107 includes a timing generator for supplying a transfer clock signal and a shutter signal to the CCD sensor 106, a circuit for performing noise reduction and gain processing of a CCD sensor output signal, and an A-D conversion circuit for converting an analog signal to a 10-bit digital signal. The CCD sensor control unit 107 further includes, e.g., a circuit for thinning out pixels in accordance with the resolution conversion instruction from the CPU 101 in order to display the live view on the outer display unit 113 and to perform the movie shooting.

The image processing unit 108 executes various kinds of image processing, such as gamma conversion, color space conversion, white balance, AE (Automatic Exposure), and flash compensation, on the 10-bit digital signal output from the CCD sensor control unit 107. Moreover, the image processing unit 108 outputs an 8-bit digital signal in the YUV (4:2:2) format.

The image pickup unit is made up of the imaging lens 105, the CCD sensor 106, the CCD sensor control unit 107, and the image processing unit 108.

The image display control unit 111 executes a process of receiving YUV digital image data transferred from the image processing unit 108 or YUV digital image data obtained by decompressing a JPEG image file stored in the data storage unit 104, converting the received data to an RGB digital signal, and outputting the RGB digital signal to the outer display unit 113.

A representation control unit 134 controls the luminescence of the above-described eleven organic electroluminescent portions 304 of the display panel 300 in accordance with the focus detection operation. Furthermore, the representation control unit 134 controls representation or non-representation of the light-blocking regions (303b and 303b') of the polymer network liquid crystal portion 303 corresponding to selected one of the shooting modes set in the camera, such as the still image shooting, the movie shooting, and the crop shooting. Moreover, the representation control unit 134 performs control of the inner display portion 129, which is formed of a liquid crystal panel (not illustrated) disposed outside (under) the finder viewing screen, including ordinary representation of a shutter time (TV (Time Value) in units of second) and an aperture control value (AV (Aperture Value)) of the imaging lens 105.

The release switch 114 instructs the start of the shooting operation. The release switch 114 has switch positions in two steps depending on pressing pressure of a release button that is a manipulating member (not illustrated) of the camera. Upon detection of a first-step position (SW1 ON), an operation of locking the camera setting, such as white balance and photometry, is performed. Upon detection of a second-step position (SW2 ON), an operation of taking in the object image signal is performed.

A photometric control unit 132 drives and controls a photometric sensor 125 formed of a CCD sensor, takes in the object luminance signal, and sends it to the CPU 101 in accordance with an instruction from the CPU 101.

The CPU 101 executes, based on the above-described information input thereto, calculations for optimum exposure of the camera, and controls the shutter speed of the camera and the aperture of the imaging lens to optimum values such that the camera is set to the optimum exposure condition. Reference symbol 116 denotes a rechargeable secondary battery or a dry battery. The DC-DC converter 117 receives electric power supplied from the battery 116, and produces plural levels of powers through boosting and regulation, thereby supplying source voltages necessary for the various components including the CPU 101. The DC-DC converter 117 can control start and stop of the voltage supply to the individual components in accordance with control signals from the CPU 101.

While the embodiment of the present invention has been described above, the present invention is not limited to the illustrated embodiment.

The embodiment has been described above in connection with the case of presenting the status representation in the optical viewfinder of the digital single-lens reflex camera. However, legible status representation can also similarly be realized in other types of optical apparatuses and observation apparatuses in which an object image focused as a primary image by an objective lens is observed after magnifying the object image by an eyepiece lens, such as a telescope, binocular telescope, and a microscope, by arranging the display panel according to the embodiment of the present invention in a primary image plane of the objective lens. Thus, the present invention can be variously changed and modified within the purport of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-039022 filed Feb. 24, 2012, which is hereby incorporated by reference herein in its entirety.

What is claimed is:

1. An optical viewfinder configured to observe an object image focused as a primary image by an objective lens, the optical viewfinder comprising:
a first display unit of self-luminous type and a second display unit of non-self-luminous type;
wherein the first display unit is arranged at a position closer to a primary image plane of the objective lens than the second display unit in a direction of an optical axis, and
wherein the first display unit of self-luminous type is disposed between a first transparent substrate and a second transparent substrate, the second display unit of non-self-luminous type is disposed between the second transparent substrate and a third transparent substrate, and the first transparent substrate has a smaller thickness than the second transparent substrate.

2. The optical viewfinder according to claim 1, wherein the first display unit includes a boundary line display portion configured to display outer peripheries of field regions of the optical viewfinder, which correspond to a plurality of finder field ranges optionally selectable by an observer, and a display region of the second display unit is arranged outside the boundary line display portion.

3. The optical viewfinder according to claim 1, wherein the second display unit is arranged in peripheral zones of a finder field and blocks off object light to make the field region of the optical viewfinder variable in size.

4. The optical viewfinder according to claim 1, wherein the second transparent substrate includes a projecting portion that extends outward of edges of the first transparent substrate and the third transparent substrate, a wiring pattern configured to drive the first display unit is formed on a first surface of the projecting portion on a same side as the first display unit, and a wiring pattern configured to drive the second display unit is formed on a second surface opposite to the first surface of the projecting portion on a same side as the second display unit.

5. The optical viewfinder according to claim 1, wherein the first display unit includes an electroluminescence element, and the second display unit includes a polymer network liquid crystal.

6. An image pickup apparatus comprising:
an imaging lens configured to form a primary image of an object scene at a primary image plane; and
an optical viewfinder disposed at a predetermined distance of the primary image plane and configured to observe the primary image focused by the imaging lens,
wherein the optical viewfinder includes:
a first display unit of self-luminous type and a second display unit of non-self-luminous type,
wherein the first display unit of self-luminous type is disposed between a first transparent substrate and a second transparent substrate, the second display unit of non-self-luminous type is disposed between the second transparent substrate and a third transparent substrate, and the first transparent substrate has a smaller thickness than the second transparent substrate; and
wherein the first display unit is arranged at a position closer to the primary image plane of the imaging lens than the second display unit in a direction of an optical axis thereof.

* * * * *